US011746572B2

(12) United States Patent
Blum et al.

(10) Patent No.: US 11,746,572 B2
(45) Date of Patent: Sep. 5, 2023

(54) ACTUATING SYSTEM FOR AN ACTUATABLE DOOR

(71) Applicant: AIRBUS HELICOPTERS DEUTSCHLAND GMBH, Donauworth (DE)

(72) Inventors: Stefan Blum, Buchdorf (DE); Christoph Merkel, Sontheim An der Brenz (DE); Marc Kirchner, Augsburg (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 158 days.

(21) Appl. No.: 17/110,666

(22) Filed: Dec. 3, 2020

(65) Prior Publication Data
US 2021/0262255 A1 Aug. 26, 2021

(30) Foreign Application Priority Data

Feb. 25, 2020 (EP) .................................... 20400005

(51) Int. Cl.
*E05B 83/00* (2014.01)
*E05C 3/00* (2006.01)
(Continued)

(52) U.S. Cl.
CPC ............ *E05B 83/00* (2013.01); *B64C 1/1461* (2013.01); *E05C 3/006* (2013.01); *E05C 3/02* (2013.01);
(Continued)

(58) Field of Classification Search
CPC ...... E05B 83/00; E05B 47/023; E05B 15/102; E05B 2047/0017; E05C 3/006;
(Continued)

(56) References Cited

U.S. PATENT DOCUMENTS 2,301,559 A * 11/1942 Marple .................. E05B 85/24
292/216
2,622,906 A * 12/1952 Endter .................... E05B 85/24
292/341.13
(Continued)

FOREIGN PATENT DOCUMENTS

DE 19825405 C2 8/2000
EP 0222160 B1 5/1987
(Continued)

OTHER PUBLICATIONS

European Search Report for European Application No. EP 20400005. 3, Completed by the European Patent Office, dated Sep. 9, 2020, 5 pages.

*Primary Examiner* — Christine M Mills
*Assistant Examiner* — Faria F Ahmad
(74) *Attorney, Agent, or Firm* — Brooks Kushman P.C.

(57) ABSTRACT

An actuating system for an actuatable door and to an actuatable door having such an actuating system. The actuating system comprises a rotatable latching shaft, a rotatable locking shaft, a latching device, comprising a latch, and a locking device. The latch is adapted to maintain the actuatable door in a closed position. The locking device comprises a locking cam, that is mounted to the locking shaft and that is adapted to engage with the latch in a closed and latched position, and a latch securing lever, that is driven by the locking cam and that is adapted to engage with the latch to maintain the latch in a closed and secured position.

19 Claims, 11 Drawing Sheets

(51) Int. Cl.
*E05C 3/02* (2006.01)
*B64C 1/14* (2006.01)

(52) U.S. Cl.
CPC ....... *B64C 1/1415* (2013.01); *Y10T 292/0829* (2015.04); *Y10T 292/0848* (2015.04); *Y10T 292/0851* (2015.04); *Y10T 292/0853* (2015.04); *Y10T 292/0947* (2015.04); *Y10T 292/1043* (2015.04); *Y10T 292/1047* (2015.04)

(58) Field of Classification Search
CPC ....... E05C 3/02; B64C 1/1461; B64C 1/1415; B64C 1/1407; Y10T 292/0848; Y10T 292/0849; Y10T 292/0821; Y10T 292/0851; Y10T 292/0854; Y10T 292/0862; Y10T 292/0911; Y10T 292/0947; Y10T 292/1039; Y10T 292/1043; Y10T 292/0828; Y10T 292/0829; Y10T 292/0853; Y10T 292/1047; Y10T 292/1082; Y10S 292/0825; Y10S 292/23
USPC ..................................... 244/129.5
See application file for complete search history.

(56) References Cited

U.S. PATENT DOCUMENTS

| | | | | |
|---|---|---|---|---|
| 2,748,855 A * | 6/1956 | Siems | ................ | B64C 1/1415 160/180 |
| 3,544,046 A * | 12/1970 | Babkin | ................ | B64C 1/1415 244/129.5 |
| 3,647,169 A * | 3/1972 | Allwright | ............ | B64C 1/1407 244/129.5 |
| 3,752,034 A * | 8/1973 | Waters | ................ | B64D 1/06 294/82.26 |
| 4,125,235 A * | 11/1978 | Fitzgerald | ............ | B64C 1/143 244/905 |
| 4,269,440 A * | 5/1981 | Gelhard | ................ | E05B 81/54 292/201 |
| 4,313,582 A * | 2/1982 | Hasquenoph | ............ | B64D 7/08 244/137.4 |
| 4,473,201 A * | 9/1984 | Barnes | ................ | B64C 1/1415 292/216 |
| 4,601,446 A * | 7/1986 | Opsahl | ................ | B64C 1/1415 49/386 |
| 4,758,030 A | 7/1988 | Kupfernagel | | |
| 4,944,473 A * | 7/1990 | Kallies | ................ | B64C 1/1407 244/129.5 |
| 4,979,384 A * | 12/1990 | Malesko | ................ | E05B 81/14 292/201 |
| 5,031,863 A * | 7/1991 | Noble | ................ | B64C 1/1407 D12/345 |
| 5,636,814 A * | 6/1997 | Rollert | ................ | B64C 1/143 244/129.4 |
| 5,819,527 A * | 10/1998 | Fournier | ................ | F02K 1/76 244/110 B |
| 5,953,904 A * | 9/1999 | Mountney | ............ | F02K 1/766 239/265.29 |
| 6,315,336 B1 * | 11/2001 | Swartzell | ............ | E05B 47/0012 292/201 |
| 6,457,675 B1 | 10/2002 | Plude et al. | | |
| 9,896,184 B2 * | 2/2018 | Brown | ................ | B64C 1/1407 |
| 10,526,064 B2 * | 1/2020 | Starman | ................ | E05B 65/001 |
| 10,662,897 B2 * | 5/2020 | Kopecek | ................ | E05C 19/12 |
| 2003/0116975 A1 * | 6/2003 | Cole | ................ | E05B 17/0029 219/95 |
| 2003/0146643 A1 * | 8/2003 | Dietl | ................ | B60J 7/1851 296/121 |
| 2010/0109349 A1 * | 5/2010 | Peabody | ................ | E05B 55/12 292/194 |
| 2011/0049299 A1 * | 3/2011 | Gowing | ................ | B64C 1/1407 244/129.5 |
| 2013/0106119 A1 * | 5/2013 | Stendal | ................ | E05C 5/02 292/113 |
| 2016/0201364 A1 * | 7/2016 | Starman | ................ | E05B 65/001 292/108 |
| 2017/0089106 A1 | 3/2017 | Rabois | | |
| 2018/0119926 A1 * | 5/2018 | Bachman | ................ | F21S 19/00 |
| 2020/0181948 A1 * | 6/2020 | Savidge | ................ | E05B 57/00 |
| 2021/0229792 A1 * | 7/2021 | Blum | ................ | B64C 1/1415 |

FOREIGN PATENT DOCUMENTS

| | | |
|---|---|---|
| EP | 0222160 A3 | 6/1988 |
| EP | 1270405 B1 | 5/2006 |
| EP | 3045387 A1 | 7/2016 |
| EP | 2170698 B1 | 10/2017 |
| EP | 3147203 B1 | 2/2018 |
| FR | 2772338 B1 | 3/2003 |
| GB | 2332705 A | 6/1999 |
| WO | 2014091294 A1 | 6/2014 |

\* cited by examiner

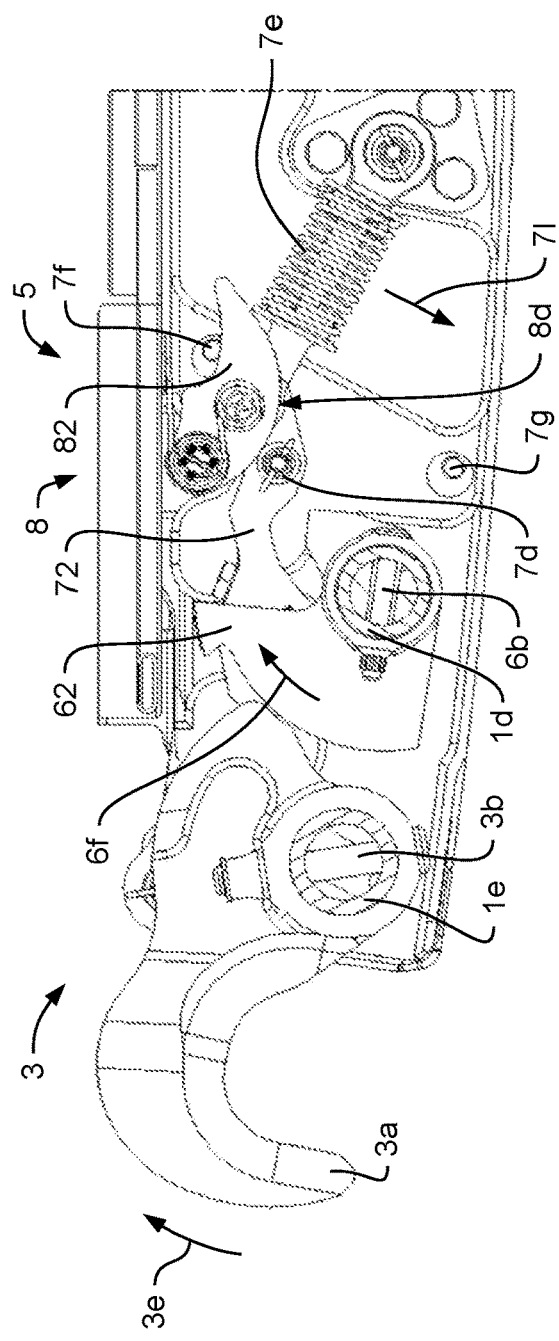
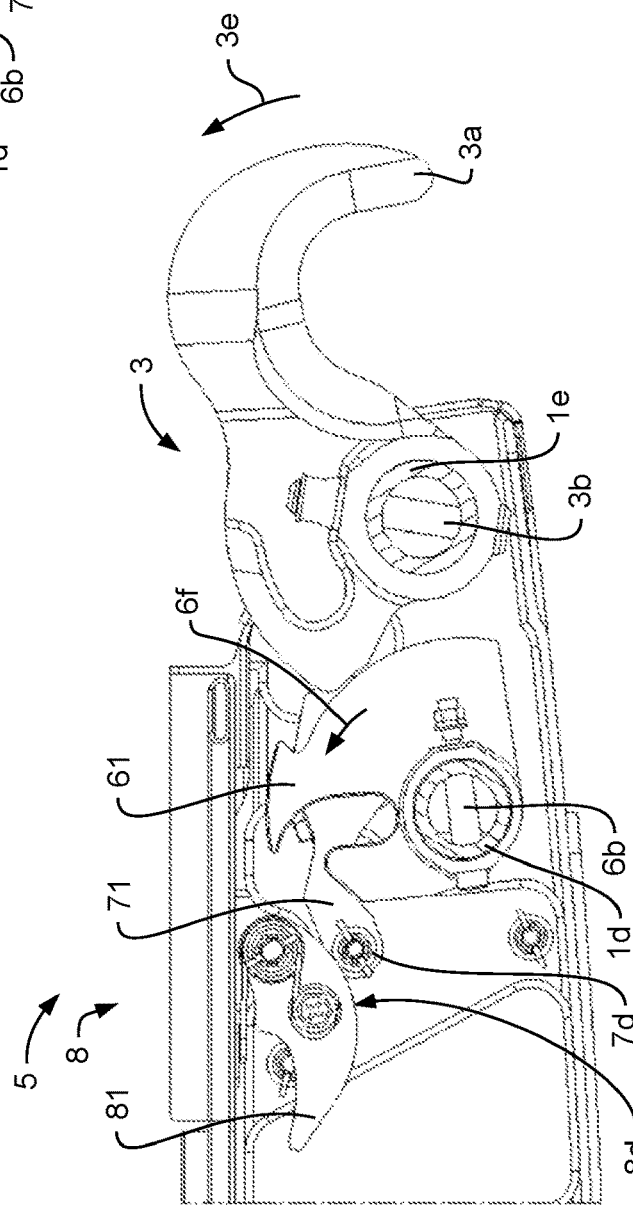
FIG. 8A
FIG. 8B

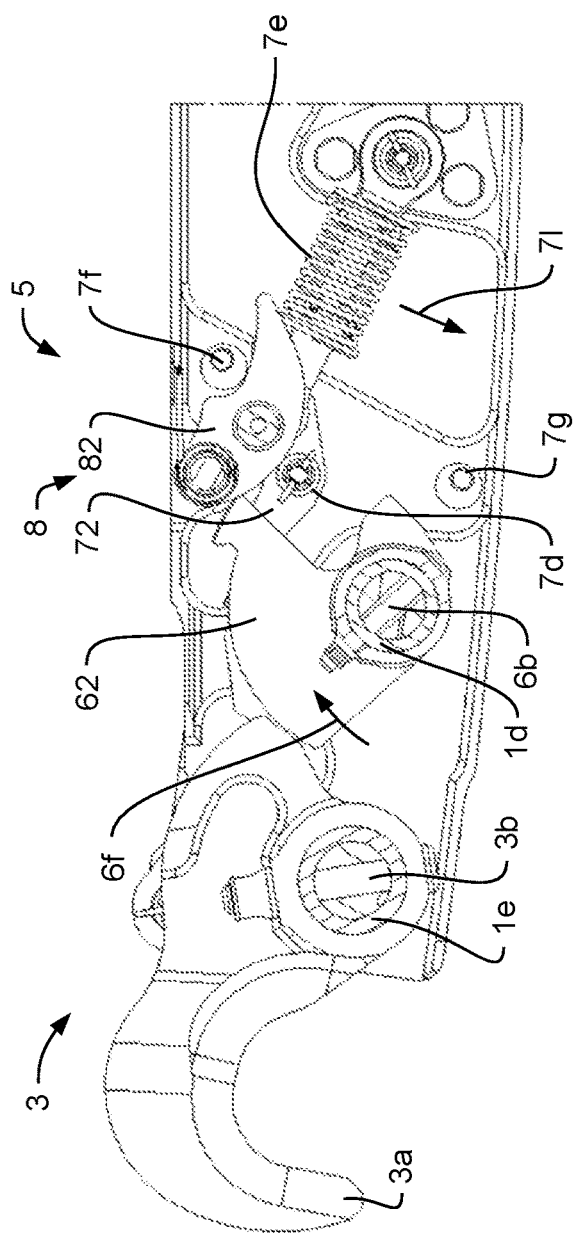
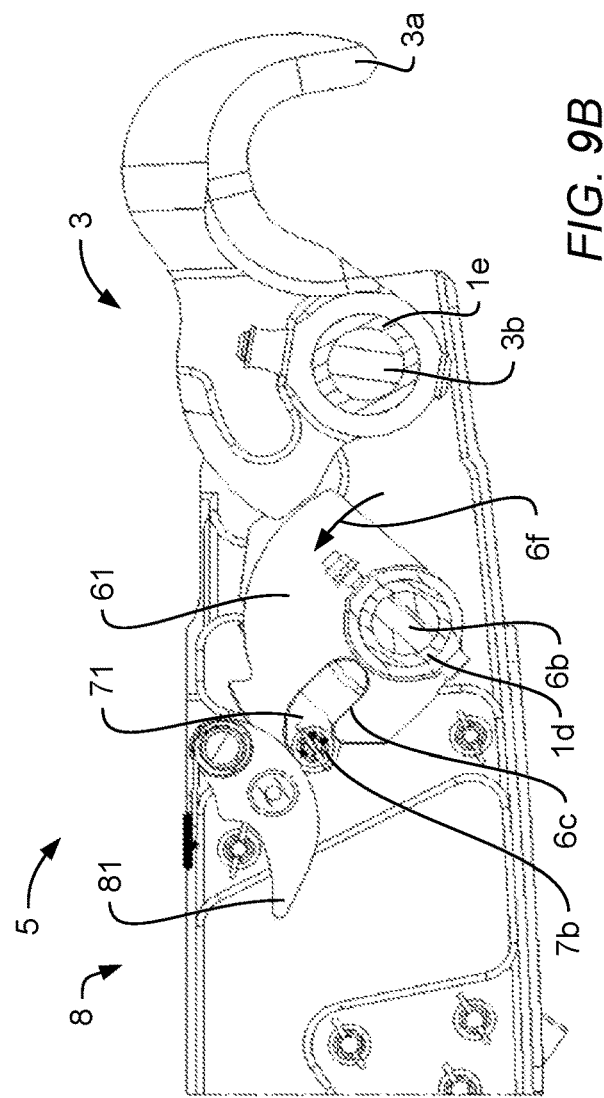
FIG. 9A
FIG. 9B

ACTUATING SYSTEM FOR AN ACTUATABLE DOOR

CROSS-REFERENCE TO RELATED APPLICATIONS

This application claims priority to European patent application No. EP 20400005.3 filed on Feb. 25, 2020, the disclosure of which is incorporated in its entirety by reference herein.

BACKGROUND OF THE INVENTION

(1) Field of the Invention

The present embodiments relate to an actuating system for an actuatable door. The present embodiments further relate to an actuatable door, in particular for an aircraft, whereby the actuatable door comprises an actuating system.

(2) Description of Related Art

Actuatable doors and, in particular, actuatable cargo doors in aircrafts usually fulfill the following major functions: they close the aircrafts in operation for maintaining a required internal pressure therein, they contribute to carrying flight loads in corresponding lower deck cargo compartments and they allow external access to the corresponding lower deck cargo compartments. Therefore, robust and safe actuating systems are required for reliably and safely closing the actuatable doors in operation, but also for fulfilling all relevant requirements defined by the competent authorities, such as e.g., in EASA CS 25.783 related to fuselage doors in general.

More specifically, according to EASA CS 25.783d (2) such actuating systems require latches and corresponding latching devices that must be designed so that, under all aircraft flight and ground loading conditions, there is no force or torque tending to unlatch the latches in the closed state of the actuatable door. In addition, the latching devices must include means for securing the latches in an associated latched state. The securing of the latches and the latches must be independent from the lock if the latches are latched.

Furthermore, according to EASA CS 25.783d (5), locking members such as locking cans must be provided for locking the latches in the associated latched state. However, any positioning of the locking members in a locking position, wherein the locking members lock the latches, must be prevented as long as the latches and the corresponding latching devices are not in their associated latched state.

The document DE 198 25 405 C2 describes a conventional actuating system for an actuatable door that fulfills these requirements and comprises a plurality of latching devices, each being provided with an associated latching hook that is adapted for latching the actuatable door in a closed position. Each latching hook can be locked in its latched state by means of a separate rotatable locking device, which is implemented as a locking cam.

More specifically, each latching hook is pivotally mounted to a first pivot bearing and connected to a pivotable mechanical transmission element via a coupling link. The latter is implemented as a first coupling rod and on the one hand pivotally mounted to the latching hook by means of a second pivot bearing and on the other hand to the pivotable mechanical transmission element by means of a third pivot bearing. The pivotable mechanical transmission element is implemented as a bell crank, which is pivotable around an associated bell crank bolt defining a fourth pivot bearing. The bell crank is further coupled to a latch lever by means of a coupling link, which is implemented as a second coupling rod. The latter is on the one hand pivotally mounted to the bell crank by means of a fifth pivot bearing and on the other hand to the latch lever by means of a sixth pivot bearing. The latch lever is coupled to a rotatable latching shaft, which defines a seventh bearing of the conventional actuating system.

When operating the conventional actuating system according to the document DE 198 25 405 C2 for latching the actuatable door in the closed position, the rotatable latching shaft is rotated in a predetermined rotational direction, thereby rotating the latch lever also into this predetermined rotational direction until the latch lever and the second coupling rod are in-line. The rotating latch lever entrains the second coupling rod, which in turn entrains the bell crank, thereby pivoting the latter into an opposed rotational direction. The pivoting bell crank thereby pushes the first coupling rod such that the latter rotates the latching hook also into this opposed rotational direction until the latching hook reaches a latching position, wherein the actuatable door is latched in the closed position. Subsequently, the locking cam is rotated in a locking position for locking and blocking the latching hook in its latched state.

For further securing and blocking the latching hook in its latched state such that the latching hook cannot be rotated accidentally or involuntarily from the latch side from its latching position back into an unlatching direction, wherein the actuatable door can be opened, the first coupling rod is driven by the pivoting bell crank into a so-called "overcentered" position. This is done by rotating slightly beyond the dead center between bell crank and first coupling rod.

More specifically, the overcentered position is defined such that any rotation of the latching hook in the above described predetermined rotational direction for unlatching the latching hook due to an external force acting on the latching hook, would only lead to a further rotation of the bell crank into the above described opposed rotational direction, which is prevented by means of a mechanical stop. In other words, when the first coupling rod is in the overcentered position, the latching hook can only be driven from its latching position into its releasing position by rotating the latch lever into the above described opposed rotational direction by means of the rotatable latching shaft.

However, the above described conventional actuating system is comparatively complicated and expensive, as each latching device thereof, i.e., without the separate rotatable locking device, comprises multiple constituent components including five moving parts in row with seven bearings involved. Consequently, this conventional actuating system is comparatively heavy and space consuming and manufacturing and assembly thereof is rather complicated due to the great number of components and tolerances.

Exemplary other mechanisms for closing aircraft doors are described in documents EP 3 045 387 A1, EP 3 147 203 B1, WO 2014/091294 A1, EP 2 170 698 B1, EP 1 270 405 B1, FR 2 772 338 B1, and EP 0 222 160 B1.

More particularly, EP 3 045 387 A1 describes an actuating system for locking an actuatable door in a closed position. The actuating system comprises at least one latching device with a latching hook. The latching hook is pivotally mounted to an associated pivot bearing and connected to a pivotable mechanical transmission element via a coupling link. In operation of the latching device and, more particularly for pivoting the latching hook from a corresponding releasing position into its locking position, during a respective latching procedure, a rotatable latching shaft is rotated by means of the latching device in a latching rotation direction, thereby pushing the coupling link towards the latching hook, which is, thus pivoted around the associated pivot bearing in the latching rotation direction until it is locked at a counter peg.

In order to guarantee that the latching hook is prevented from an uncontrolled and/or accidental unlatching by a back-driving force thereon, the coupling link and the pivotable mechanical transmission element are preferably overcentered. An overcentering adjustment device is provided. The overcentering adjustment device is adapted for pivoting the pivotable mechanical transmission element in operation at least from an in-line position, wherein the latching hook is in locked state and unlocking is possible, into an overcentered position, wherein the latching hook is in the locked state and unlocking is prevented.

Furthermore, the pivotable mechanical transmission element is coupled to at least one locking device, adapted for securing the latching hook in its locked state. The locking device comprises a locking cam which is adapted for locking the latching hook in its locked state and, at the same time, for blocking the bell crank in the overcentered position. The locking cam is attached to a locking shaft, and rotatable by means of this locking shaft.

However, in many state-of-the-art designs, each of the latching hooks is installed on a separate fixed bolt, which serves as rotation axis for the latching hooks. Each latching hook is driven by the latching shaft via its own drive mechanism. In document EP 3 045 387 A1, the drive mechanism consists of an overcentered rod linkage and a rod linkage close to the overcentering device. The latching hooks are not directly connected to each other, but all driven individually by the latching shaft via their drive mechanism. In addition, each drive mechanism serves as latch securing means for its latching hook. Each latching hook is locked by an individual locking device, mounted on the locking shaft. The locking device is locking the latching hook and monitoring the latched position of the latch.

BRIEF SUMMARY OF THE INVENTION

It is, therefore, an objective to provide a new actuating system for an actuatable door that is suitable to overcome the above-described drawbacks. In particular, the new actuating system should have a very compact design and comprise fewer constituent components, is easier to produce and assemble, and comparatively inexpensive to manufacture compared to state-of-the-art actuating systems. Furthermore, it is an objective to provide a new actuatable door comprising such a new actuating system.

This objective is solved by an actuating system for an actuatable door, said actuating system comprising the features of claim 1.

More specifically an actuating system for an actuatable door may comprise a rotatable latching shaft, a rotatable locking shaft, a latching device and a locking device. The latching device comprises a latch and a latch securing lever. The latch is non-rotatably mounted to the rotatable latching shaft and adapted for maintaining the actuatable door in a closed position. Rotation of the rotatable latching shaft causes a rotation of the latch. The latch securing device comprises first and second contact surfaces, wherein the first contact surface is adapted to engage with the latch to maintain the latch in a closed and secured position. The locking device comprises a locking cam that is non-rotatably mounted to the rotatable locking shaft such that a rotation of the rotatable locking shaft causes a rotation of the locking cam. The locking cam drives the latch securing lever and comprises third and fourth contact surfaces. The third contact surface is adapted to engage with the latch to lock the latch in a closed and latched position. The fourth contact surface is adapted to engage with the second contact surface of the latch securing lever to prevent the latch securing lever from disengaging from a latched position while the locking cam is engaged.

Preferably, the fourth contact surface is adapted to engage with the second contact surface of the latch securing lever to prevent the latch securing lever from disengaging from a latched position in case of a single failure while the locking cam is engaged. For example, the single failure may include a failure of the latch securing lever. In other words, the fourth contact surface may be adapted to engage with the second contact surface of the latch securing lever to prevent the latch securing lever from disengaging from a latched position in case of a failure of the latch securing lever while the locking cam is engaged. Thus, in a locked position, the latch securing may be independent from the locking system, and the contact between the locking system and the latching system may only take place after a failure in the latch securing.

According to the present embodiments, the driving mechanism of the latches may be simplified. The latches, the latch securing lever, and the locking cam are easily integrated.

By way of example, the actuating system comprises a centralized latch drive that drives the first rotatable latching shaft that ultimately causes a rotation of all latches that are mounted to the second rotatable latching shaft. Thus, all latches are driven by the minimum required number of latch drives.

If desired, the actuatable door may include I-shaped frames. The latches may be slotted and at least one latch of the latches may be attached to the second rotatable latching shaft on both sides of an I-profile frame.

The actuatable system cannot be locked or secured if the latch is unlatched.

Illustratively, the latch securing lever is actively driven by the locking cam. Preferably, the latch securing lever is independent from the locking mechanism in the secured position. The latch securing lever is not part of the operation mechanism of the latch. If desired, the latch securing lever is kept in the secured position by means of a compression spring unit.

The latch securing lever is maintained in the secured position by the lock in case of a failure of the compression spring unit. Maintaining the latch securing lever in its secured position by the lock will not create any force or torque tending to unlock the lock.

By way of example, two lock lockage components, independent from each other, may be installed on the two sides of the I-profile frame. If the latch securing lever is missing or broken, the lock lockage component is pushed against the locking cam by a spring or by the gravitational force in case of a spring failure. The lock lockage component engages with the locking cam and blocks a rotation of the rotatable locking shaft.

In other words, the locking mechanism may not move into a locked position in case of a failure of the latch securing mechanism.

In case of a compression spring unit failure, latch securing lever rotation may be blocked at contact surfaces between the latch securing lever and the locking cam. The contact surfaces between the latch securing lever and the locking cam generate a self-locking torque on the locking shaft due to the shape of the contact surfaces.

According to one aspect, the actuating system further comprises at least one pin that prevents a rotation of the latch relative to the rotatable latching shaft.

According to one aspect, the actuating system further comprises at least one pin that prevents a rotation of the locking cam relative to the rotatable locking shaft.

According to one aspect, the actuating system further comprises a spring unit. The latch securing lever is mounted to the spring unit.

According to one aspect, the actuating system further comprises first and second stop bolts. The latch securing lever is movable between the first stop bolt and the second stop bolt.

According to one aspect, the latch securing lever further comprises at least one actuating roller that is attached to the latch securing lever.

According to one aspect, the locking cam further comprises a guide contour that is adapted to drive the at least one actuating roller of the latch securing lever.

According to aspect, the actuating system further comprises at least one lock lockage that is adapted to maintain the locking device in an unlocked position in case of a failure of the latch securing lever.

According to one aspect, each one of the at least one lock lockage further comprises a lock lockage shaft and first and second lock lockage components that are mounted to the lock lockage shaft, whereby the first lock lockage component is operable independently from the second lock lockage component.

According to one aspect, the latch securing lever further comprises first and second contact rollers that are attached to the latch securing lever.

According to one aspect, the first and second lock lockage components further comprise respective fifth and sixth contact surfaces. The fifth contact surface is adapted to engage with the first contact roller and the sixth contact surface is adapted to engage with the second contact roller.

According to one aspect, the first and second lock lockage components further comprise respective first and second springs, wherein the first spring is adapted to push the first lock lockage component in a first blocking direction and wherein the second spring is adapted to push the second lock lockage component in a second blocking direction.

According to one aspect, the locking device is adapted to be mounted onto a frame of the actuatable door, wherein the frame is particularly embodied as an I-frame.

According to one aspect, the actuating system further comprise at least one additional latching device comprising an additional latch that is non-rotatably mounted to the rotatable latching shaft and adapted for maintaining the actuatable door in the closed position, wherein the rotation of the rotatable latching shaft causes a rotation of the additional latch.

Moreover, an actuatable door in particular for an aircraft may comprise the actuating system described above.

BRIEF DESCRIPTION OF THE DRAWINGS

Embodiments are outlined by way of example in the following description with reference to the attached drawings. In these attached drawings, identical or identically functioning components and elements are labeled with identical reference numbers and characters and are, consequently, only described once in the following description.

FIG. 8A is a side view of the illustrative latching and locking devices of FIG. 3 in a fully latched and locked position in accordance with some embodiments, FIG. 8B is a side view of the illustrative latching and locking devices of FIG. 2 in a fully latched and locked position in accordance with some embodiments, FIG. 9A shows the illustrative latching and locking devices of FIG. 8A in a fully latched and in an intermediate position between fully locked and unlocked in accordance with some embodiments, FIG. 9B shows the illustrative latching and locking devices of FIG. 8B in a fully latched and in an intermediate position between fully locked and unlocked in accordance with some embodiments.

DETAILED DESCRIPTION OF THE INVENTION

Figure 1:
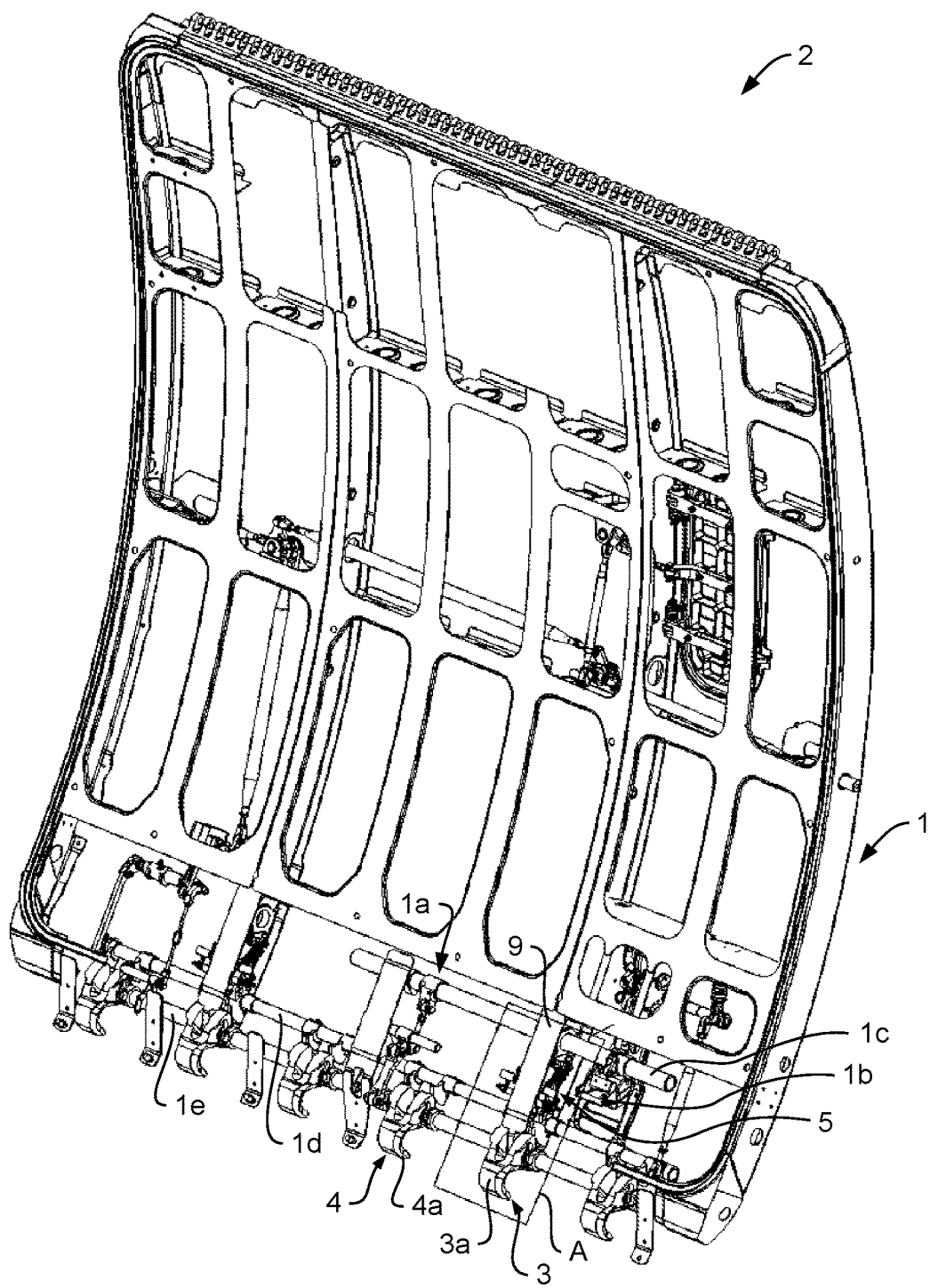
FIG. 1 is a schematic diagram of an illustrative actuatable door with an illustrative actuating system having an actuating device, a latching device, and a locking device in accordance with some embodiments.

FIG. 1 shows an actuating system 1 for an actuatable door 2 in accordance with some embodiments. In other words, FIG. 1 shows an actuatable door 2 comprising actuating system 1. The actuating system 1 is exemplarily adapted for reliably and securely latching and locking the actuatable door 2 in a closed position, such that the actuatable door 2 preferentially fulfils all relevant requirements defined by the competent authorities, such as e.g., in EASA CS 25.783.

The actuatable door 2 may be adapted to close an associated door mounting structure, such as a fuselage of an aircraft, preferentially in a fluid-tight manner. According to one aspect, the actuatable door 2 is a cargo door of an aircraft.

However, it should be noted that the use of actuatable door 2 is not restricted to cargo doors of aircrafts. Instead, actuatable door 2 may be used for any actuatable doors, including actuatable doors in vessels, such as ships and so on. Such actuatable doors may be equipped with the inventive actuating system 1.

Illustratively, the actuating system 1 comprises an actuating device 1a. Actuating device 1a may be adapted for actuating respectively rotating a rotatable actuating shaft 1c. As an example, actuating device 1a may include an operating handle 1b. If desired, actuating device 1a may include any device that is able to actuate respectively rotate the rotatable actuating shaft 1c. For example, actuating device 1a may include a wheel, a knob, or a motor and any other device that is able to control the motor. If desired, the actuating device 1a may be adapted for rotating a rotatable locking shaft 1d in operation.

Illustratively, the rotatable actuating shaft 1c may be linked to a rotatable latching shaft 1e. Upon actuation of the operating handle 1b, the rotatable actuating shaft 1c rotates and causes a rotation of the rotatable latching shaft 1e.

Actuating system 1 may comprise a latching device 3, which is described in more detail below with reference to FIGS. 2 and 3. Actuating system 1 may comprise an additional latching device 4.

If desired, the respective latching and unlatching mechanisms of the latching device 3 and the additional latching device 4 may be similar. It should be noted that the actuating system 1 illustratively comprises six such latching devices 3, 4, but for simplicity and clarity of the drawings, only a single latching device is labeled with the reference sign 3, and only one single additional latching device is labeled with the reference sign 4.

If desired, actuating system 1 may comprise any number of latching devices. For example, actuating system 1 may include two, three, four, five, seven, eight, etc. latching devices 3. An illustrative latching device is described below with reference to FIG. 2 and FIG. 3 representative for all latching devices of actuating system 1.

By way of example, the latching device 3 comprises a latch 3a, which is non-rotatably mounted to the rotatable latching shaft 1e. Latch 3a may be latchable at an associated counter peg provided at a door frame, non-represented for simplicity and clarity. Likewise, the additional latching device 4 comprises an additional latch 4a, which is non-rotatably mounted to the rotatable latching shaft 1e.

Illustratively, first and second latches 3a, 4a may be implemented as hooks, as C-latches, as toggle latches, or as any other latches that may be latchable at associated devices (e.g., counter pegs, cylinders, or shafts) provided at a door frame. If desired, first and second latches 3a, 4a may be implemented as cylinders or shafts and the associated devices provided at a door frame may be implemented as hooks or C-latches.

Thus, a rotation of the rotatable latching shaft 1e causes a rotation of latch 3a and additional latch 4a, because latch 3a and additional latch 4a are both non-rotatably mounted to the rotatable latching shaft 1e.

For the remainder of this description it is assumed that the latch 3a is latching the actuatable door 2 in the closed position when the additional latch 4a is latching the actuatable door 2 in the closed position and vice versa. Similarly, the latch 3a is unlatching the actuatable door 2 when the additional latch 4a is unlatching the actuatable door 2 and vice versa.

Illustratively, a locking device 5 is mounted to a frame 9 and interfaces with the latching device 3. Exemplarily, the latch 3a may be locked in its locked state by means of the locking device 5. This locking device 5 will be described below with reference to FIGS. 2 and 3.

Figure 2:
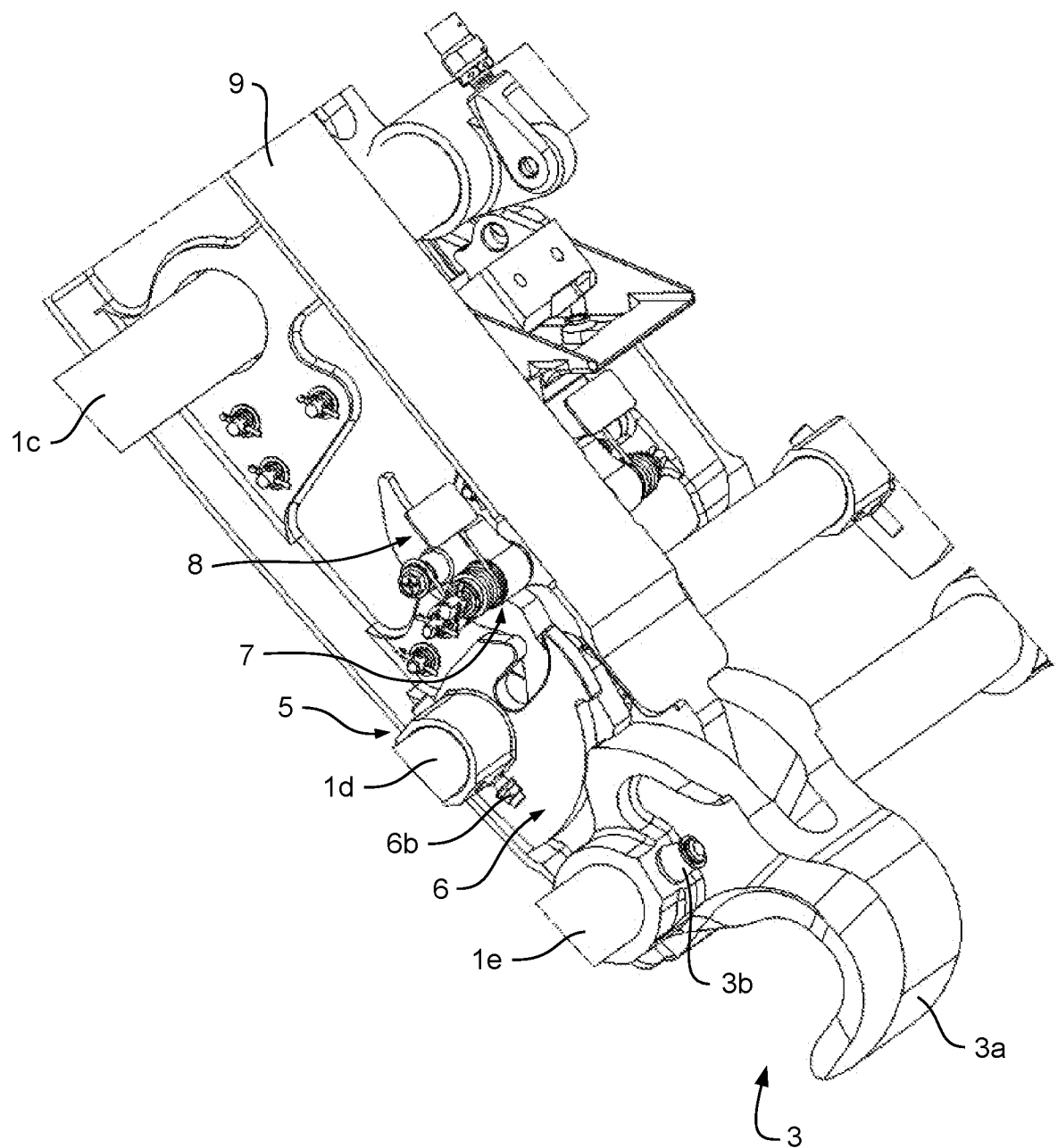
FIG. 2 is a three-dimensional diagram of the illustrative latching and locking devices of FIG. 1 seen from a first side of an I-profile frame in accordance with some embodiments.
Figure 3:
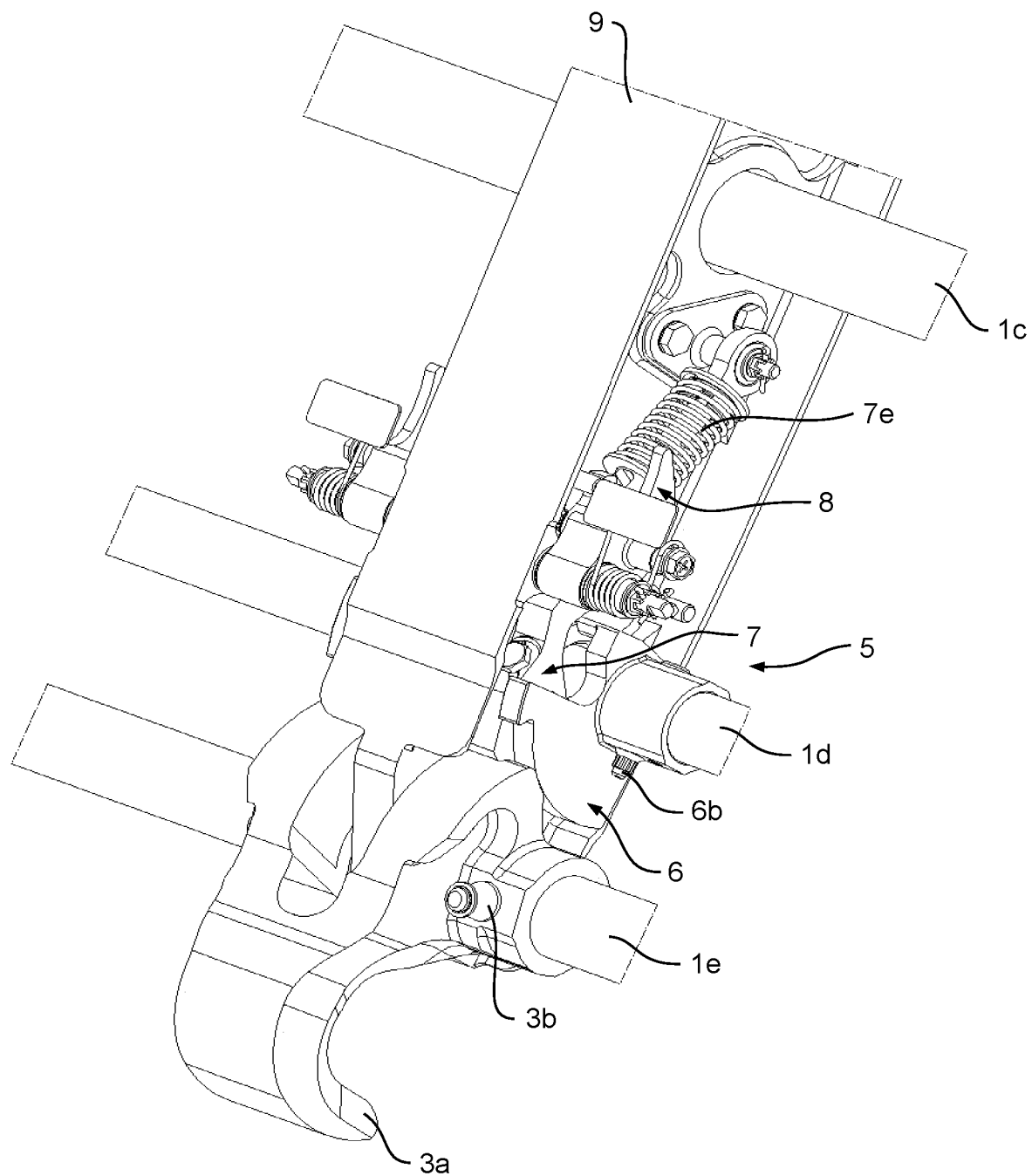
FIG. 3 is a three-dimensional diagram of the illustrative latching and locking devices of FIG. 1 seen from a second side of an I-profile frame in accordance with some embodiments.

FIG. 2 and FIG. 3 show an enlarged view of the illustrative actuatable door 2 of FIG. 1 with a focus on portion A of the actuatable door of FIG. 1.

Illustratively, the actuating system (e.g., actuating system 1 of FIG. 1) may be mounted to an actuatable door (e.g., actuatable door 2 of FIG. 1). and adapted for latching and/or locking this actuatable door (e.g., actuatable door 2 of FIG. 1) in a closed and latched position in an associated door frame, which is e.g., defined by a fuselage of an aircraft as described above and, illustratively, associated with a cargo door thereof.

In particular, FIG. 2 is a three-dimensional diagram of the illustrative latching and locking devices 3, 5 of FIG. 1 seen from a first side of I-profile frame 9, and FIG. 3 is a three-dimensional diagram of the illustrative latching and locking devices 3, 5 of FIG. 1 seen from a second side of I-profile frame 9. As exemplarily shown, the actuating system may be in a fully latched and locked position.

By way of example, the actuating system may include an actuating rotatable shaft 1c, a rotatable latching shaft 1e, a rotatable locking shaft 1d, a latching device 3, and a locking device 5.

Illustratively, the actuating rotatable shaft 1c is represented as passing through the I-profile frame 9. However, actuating rotatable shaft 1, does not directly impact the movement of locking device 5.

The latching device 3 may comprise a latch 3a that is non-rotatably mounted to the rotatable latching shaft 1e and adapted for maintaining the actuatable door 2 in a closed position. Rotation of the rotatable latching shaft 1e causes a rotation of the latch 3a.

If desired, the latch 3a may be non-rotatably mounted to the rotatable latching shaft 1e by means of at least one pin 3b. In other words, the at least one pin 3b may prevent a rotation of the latch 3a relative to the second rotatable latching shaft 1e.

If desired, latch 3a may be slotted and mounted on two sides of I-profile frame 9. For example, latch 3a may be mounted to the rotatable latching shaft 1e by means of two pins 3b, one on each side of the I-profile frame 9.

The locking device 5 is provided and adapted for locking the latch 3a in its closed and latched position. Illustratively, the locking device 5 is adapted to be mounted onto a frame 9. As shown, the frame 9 may be embodied as an I-profile frame.

The locking device 5 may prevent a rotation of the latch 3a when the latch 3a latches the actuatable door (e.g., actuatable door 2 of FIG. 1) in the closed position. The locking device 5 illustratively comprises a locking cam 6, and the latching device 3 may include a latch securing lever 7.

The locking cam 6 is non-rotatably mounted to the rotatable locking shaft 1d such that a rotation of the rotatable locking shaft 1d causes a rotation of the locking cam 6. The locking cam 6 is adapted to engage with the latch 3a to lock the latch 3a in a closed and latched position.

By way of example, the locking cam 6 is non rotatably mounted to the rotatable locking shaft 1d, through at least one pin 6b. The at least one pin 6b prevents rotation of the locking cam 6 relative to the rotatable locking shaft 1d.

The latch securing lever 7 is driven by the locking cam 6, as explained below with reference to FIGS. 8A to 12B. The latch securing lever 7 is adapted to engage with the latch 3a to secure the latch 3a in a closed and latched position.

If desired, the locking cam 6 is adapted to engage with the latch securing lever 7 to prevent the latch securing lever 7 from disengaging from a latched position while the locking cam 6 is engaged. In other words, the locking cam 6 is adapted to engage with the latch securing lever 7 to maintain the latch 3a in a latch secured position (e.g., in case of a predetermined failure of the actuating system such as actuating system 1 of FIG. 1).

The actuating system may comprise a lock lockage 8 that is adapted to maintain the locking device 5 in an unlocked position in case of a failure of the latch securing lever 7.

As exemplarily shown in FIG. 3, locking device 5 may include a locking cam 6 that is non rotatably mounted to the rotatable locking shaft 1d. The locking cam 6 is mounted to the rotatable locking shaft 1d by means of at least one pin 6b, if desired. The at least one pin 6b may prevent rotation of the locking cam 6 relative to the rotatable locking shaft 1d.

Illustratively, the actuating system may include at least one lock lockage 8. Lock lockage 8 may be adapted to maintain the locking device 5 in an unlocked position in case of a failure of the latch securing lever 7.

Exemplarily, the latching device 3 may include a latch securing lever 7. The latch securing lever 7 may be mounted to a spring unit 7e. If desired, the spring unit 7e is mounted to the I-profile frame 9. If desired, spring unit 7e may be embodied by a compression spring or any other suitable spring system. Spring unit 7e may be mounted to the i-profile frame 9 to keep the latch securing lever 7 in the secured position.

FIGS. 4 to 7 are three-dimensional diagrams of the different components of latching device 3 and locking device 5 of FIGS. 2 and 3.

Figure 4:
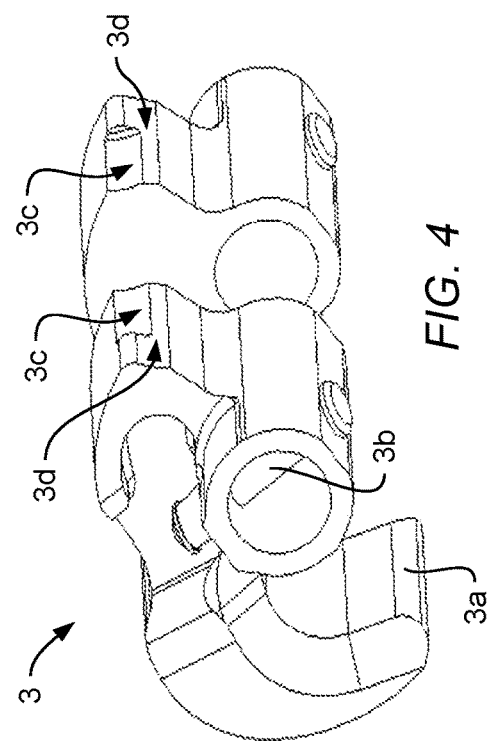
FIG. 4 is a three-dimensional diagram of an illustrative latch in accordance with some embodiments.

More particularly, FIG. 4 shows the latching device 3. The latching device 3 comprises latch 3a. The latch 3a is mounted to its support (e.g., rotatable latching shaft 1e of FIGS. 2 and 3) by means of at least one pin 3b. The support of latch 3a is not represented here for simplicity and clarity.

The at least one pin 3b prevents a rotation of the latch 3a relative to the support (e.g., rotatable latching shaft 1e of FIGS. 2 and 3).

As exemplarily shown in FIG. 4, latch 3a may be slotted. If desired, a slotted latch may be mounted on two sides of an I-profile frame (e.g., I-profile frame 9 of FIGS. 2 and 3).

For example, latch 3a may be mounted to the rotatable latching shaft 1e by means of two pins 3b, one on each side of the I-profile frame.

The latch 3a may comprise contact surfaces 3c and 3d. For example, contact surfaces 3c may be used to engage with the latch securing lever 7. In other words, latch securing lever 7 may engage with contact surfaces 3c to maintain the latch 3a in a closed and latched position. If desired, the latch 3a may comprise two contact surfaces 3c.

If desired, the latch 3a comprises contact surfaces 3d. The contact surfaces 3d may be used to engage with the locking cam 6. In other words, locking cam 6 may engage with contact surfaces 3d to maintain the latch 3a in a closed and locked position. If desired, the latch 3a may comprise two contact surfaces 3d.

Figure 5:
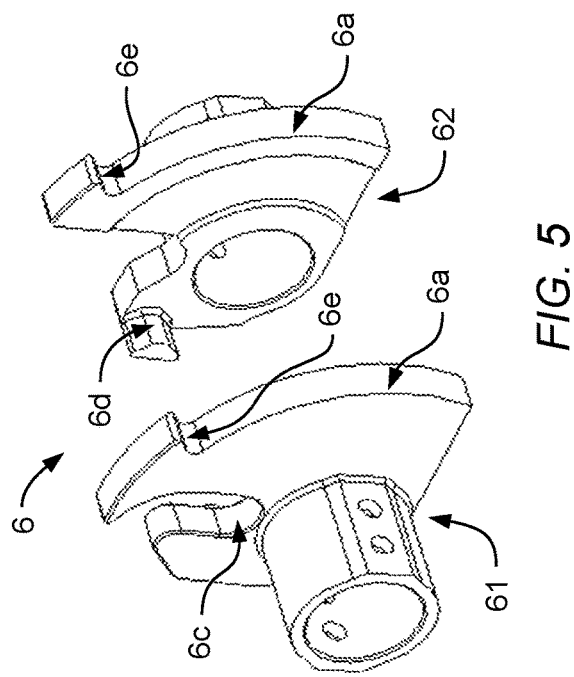
FIG. 5 is a three-dimensional diagram of an illustrative locking cam in accordance with some embodiments.

FIG. 5 shows an illustrative locking cam 6 of a locking device (e.g., locking device 5 of FIGS. 2 and 3). The locking cam 6 may be mounted non-rotatably to the rotatable locking shaft (e.g., rotatable locking shaft 1d of FIGS. 2 and 3), not represented here for simplicity and clarity.

Exemplarily, the locking cam 6 comprises contact surfaces 6a and 6d. Contact surface 6a is adapted to engage with the latch 3a in order to maintain the latch 3a in a closed and locked position.

The contact surface 6d is adapted to engage with the latch securing lever 7 in order to prevent the latch securing lever 7 from disengaging from a latched position while the locking cam 6 is engaged.

By way of example, the locking cam 6 may include a guide contour 6c. The guide contour 6c is adapted to drive an actuating roller of a latch securing lever (e.g., actuating roller 7b of the latch securing lever 7 of FIG. 6), upon actuation.

The locking cam 6 may comprise a blocking counterpart 6e. The blocking counterpart 6e may be used to block the locking cam 6 in case of the occurrence of a failure of a latch securing lever (e.g., latch securing lever 7 of FIG. 6).

Illustratively, the locking cam 6 comprises a first locking cam component 61 and a second locking cam component 62. If desired, each one of first and second locking cam components 61, 62 comprises contact surfaces 6a, 6d and a blocking counterpart 6e.

Figure 6:
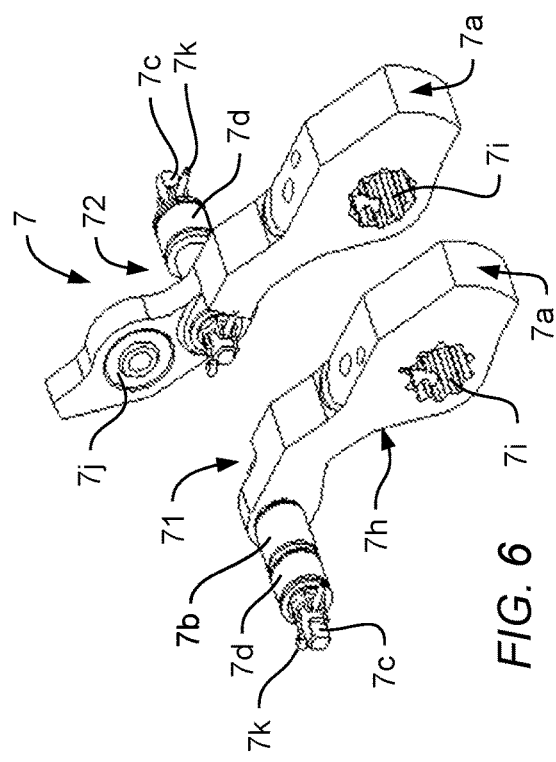
FIG. 6 is a three-dimensional diagram of an illustrative latch securing lever in accordance with some embodiments.

As exemplarily shown in FIG. 6, the latch securing lever 7 may comprise contact surfaces 7a and 7h. The contact surface 7a is adapted to engage with the latch 3a in order to maintain the latch 3a in a closed and latched position.

Contact surface 7h is adapted to engage with a contact surface of a locking cam (e.g., contact surface 6d of locking cam 6 of FIG. 5) to prevent the latch securing lever 7 from disengaging from a latched position while the locking cam is engaged.

The latch securing lever 7 may include an actuating roller 7b. The actuating roller 7b may be attached to the latch securing lever 7. For example, the actuating roller 7b may be mounted to a roller shaft 7c.

Upon actuation, the actuating roller 7b may be driven by a guide contour of a locking cam (e.g., guide contour 6c of locking cam 6 of FIG. 5). Movement of the actuating roller 7b may cause movement of the latch securing lever 7.

Illustratively, the latch securing lever 7 may comprise first and second contact rollers 7d. The first and second contact rollers 7d may be attached to the latch securing lever 7. As an example, the first and second contact rollers 7d may be mounted to roller shaft 7c.

Figure 7:
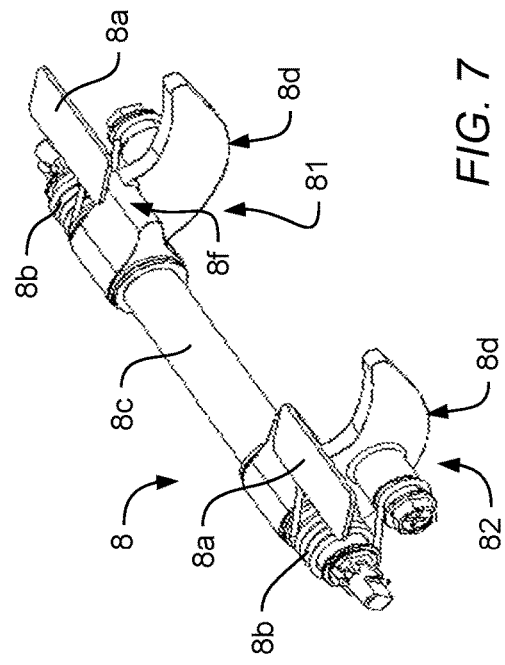
FIG. 7 is a three-dimensional diagram of an illustrative lock lockage in accordance with some embodiments.

Exemplarily, the first and second contact rollers 7d are adapted to engage with a lock lockage (e.g., lock lockage 8 of FIG. 7). For example, the first and second contact rollers 7*d* may control the angular position of the lock lockage.

At least one securing device 7*k* may be mounted at the end of the roller shaft 7*c*. The at least one securing device 7*k* may secure the first and second contact rollers 7*d* on roller shaft 7*c*. If desired, the at least one securing device 7*k* may include a pin through roller shaft 7*c*.

Illustratively, the latch securing lever 7 comprises a first latch securing lever component 71 and a second latch securing lever component 72. As exemplarily shown in FIG. 6, first and second latch securing lever components 71 and 72 may have separate roller shafts 7*c*.

Illustratively, the first and second latch securing lever components 71, 72 comprise an opening with serrations 7*i*. The first and second latch securing lever components 71, 72 may be connected together by means of a shaft. The shaft may be passing through the serrations 7*i*. This shaft is not represented here for simplicity and clarity.

By way of example, actuation of the first latch securing lever component 71 may cause a movement of the second latch securing lever component 72, and vice versa.

Illustratively, the second latch securing lever component 72 may include a spherical bearing 7*j*. The spherical bearing 7*j* may enable a connection of the latch securing lever 7 with a spring unit (e.g., spring unit 7*e* of FIG. 3).

FIG. 7 is a three-dimensional diagram of the lock lockage 8. The lock lockage 8 is adapted to maintain the locking device 5 in an unlocked position in case of a failure of the of the latch securing lever component 71, 72, as described below with reference to FIGS. 13A to 14C.

The lock lockage 8 comprises a lock lockage shaft 8*c*, and first and second lock lockage components 81, 82. First and second lock lockage components 81, 82 may be mounted to lock lockage shaft 8*c*. If desired, the first lock lockage component 81 is operable independently from the second lock lockage component 82, and vice versa.

Illustratively, first and second lock lockage components 81, 82 may include respective contact surfaces 8*d*. The respective contact surfaces 8*d* may be adapted to engage with contact rollers of latch securing lever components.

For example, the contact surface 8*d* of first lock lockage component 81 may be adapted to engage with contact roller 7*d* of latch securing lever component 71 of FIG. 6, and contact surface 8*d* of second lock lockage component 82 may be adapted to engage with contact roller 7*d* of latch securing lever component 72 of FIG. 6.

First and second lock lockage components 81, 82 exemplarily comprise respective first and second springs 8*b*. The first spring 8*b* is adapted to push the first lock lockage component 81 in a first blocking direction (e.g., blocking direction 8*g* of FIG. 13C). The second spring 8*b* is adapted to push the second lock lockage component 82 in a second blocking direction (e.g., blocking direction 8*g* of FIG. 13A). A spring contact 8*a* may be used to pre-torque each one of the first and second springs 8*b*.

First and second lock lockage components 81, 82 may comprise contact surfaces 8*f*. Contact surface 8*f* of the first lock lockage component 81 may engage with the blocking counterpart 6*e* of the first locking cam component 61 of FIG. 5 in case of a failure of latch securing lever 7, and contact surface 8*f* of the second lock lockage component 82 may engage with the blocking counterpart 6*e* of the second locking cam component 62 of FIG. 5 in case of a failure of latch securing lever 7.

As an example, contact surface 8*f* of first and/or second lock lockage components 81, 82 may engage with the respective blocking counterpart 6*e* of the first and/or second locking cam component 61, 62 of FIG. 5 if the latch securing is missing. In this example, first and/or second spring 8*b* may push first and/or second lock lockage component 81, 82 in contact with the blocking counterpart 6*e* of the first and/or second locking cam component 61, 62 of FIG. 5, thereby blocking the rotation of the rotatable locking shaft (e.g., rotatable locking shaft 1*d* of FIGS. 2 and 3).

As another example, contact surface 8*f* of first and/or second lock lockage components 81, 82 may engage with the respective blocking counterpart 6*e* of the first and/or second locking cam component 61, 62 of FIG. 5 if first and/or second spring 8*b* is failing. In this example, the gravitational force may push first and/or second lock lockage component 81, 82 in contact with the blocking counterpart 6*e* of the first and/or second locking cam component 61, 62 of FIG. 5, thereby blocking the rotation of the rotatable locking shaft (e.g., rotatable locking shaft 1*d* of FIGS. 2 and 3).

Illustratively, FIGS. 8A to 12B show latching and locking devices 3, 5 of FIGS. 2 and 3 at different phases of an unlocking and unlatching operation of latch 3*a*. A similar unlocking and unlatching operation may unlock and unlatch latch 4*a* of FIG. 1.

More particularly, FIG. 8A is a side view of the illustrative latching and locking devices of FIG. 3 that include latching device 3, locking device 5, and lock lockage 8 in a fully latched and locked position, and FIG. 8B is a side view of the illustrative latching and locking devices of FIG. 2 that include latching device 3, locking device 5, and lock lockage 8 in a fully latched and locked position in accordance with some embodiments.

Exemplarily, the latch 3*a* is maintained in a fully latched and locked position by the locking device 5. More specifically, first and second locking cam components 61, 62 are blocking the latch 3*a*. Thereby, first and second locking cam components 61, 62 prevent a rotation of the latch 3*a* in an unlatching rotation direction 3*e*.

Illustratively, first and second latch securing lever components 71, 72 are blocking the latch 3*a*. First and second latch securing lever components 71, 72 prevent the rotation of the latch 3*a* in the unlatching rotation direction 3*e*.

As an example, the first and second locking cam components 61, 62 are non-rotatably mounted to the rotatable locking shaft 1*d* by means of at least one pin 6*b*.

As exemplarily shown in FIG. 8A, the second latch securing lever component 72 is maintained in a latch securing position by means of the spring unit 7*e*. The spring unit 7*e* may be mounted to a frame (e.g., I-profile frame 9 of FIG. 2 or 3).

By way of example, the actuating system may comprise first and second stop bolts 7*f*, 7*g*. First and second stop bolts 7*f*, 7*g* may be mounted to the frame, if desired (e.g., I-profile frame 9 of FIG. 2 or 3).

The latch securing lever 7 may be movable between the first stop bolt 7*f* and the second stop bolt 7*g*. In other words, the movement of the latch securing lever 7 is limited by the first stop bolt 7*f* and by the second stop bolt 7*g*.

Illustratively, the movement of the latch securing lever 7 may be blocked in the secured position by first stop bolt 7*f*.

As exemplarily shown in FIGS. 8A and 8B, the contact surface 8*d* of the first lock lockage component 81 may engage with the first contact roller 7*d*, and the contact surface 8*d* of the second lock lockage component 82 may engage with the second contact roller 7*d*. In other words, the first lock lockage component 81 is maintained in a position not blocking the lock by the first contact roller 7*d*, and the second lock lockage component 82 is maintained in a position not blocking the lock by the second contact roller 7*d*.

FIG. 9A and FIG. 9B show a first part of the unlocking and unlatching operation, in which the unlocking operation has started. During the first part of the unlocking operation, the latch 3*a* is still in a latched position and the locking device 5 is still locking the latch 3*a*.

The rotatable locking shaft 1*d* starts rotating in an unlocking rotation direction 6*f*. Rotation of the rotatable locking shaft 1*d* causes a rotation of the first and second locking cam components 61, 62 in the unlocking rotation direction 6*f*.

As exemplarily shown in FIG. 9A, the second latch securing lever component 72 is not anymore in contact with the first stop bolt 7*f*.

Illustratively, the spring unit 7*e*, which is mounted to the second latch securing lever component 72 is driven in a releasing direction 7*l*.

As exemplarily shown in FIG. 9B, the guide contour 6*c* of the first locking cam component 61 starts engaging with the actuating roller 7*b*.

Figure 10A:
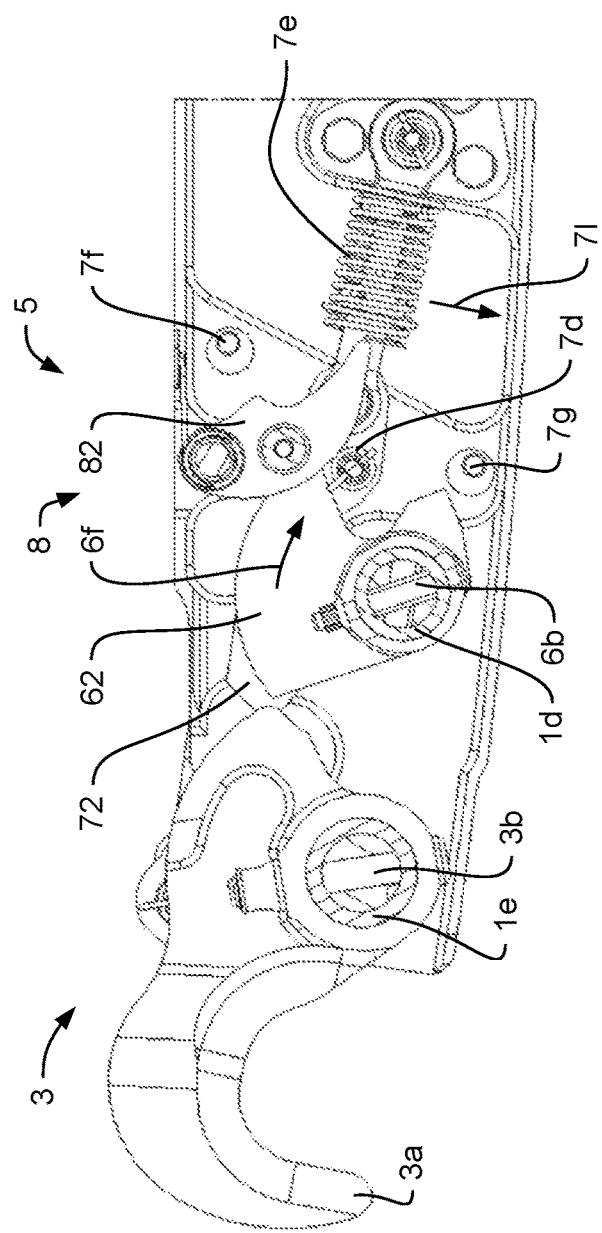
FIG. 10A shows the illustrative latching and locking devices of FIGS. 8A and 9A in a latched and unlocked position in accordance with some embodiments.
Figure 10B:
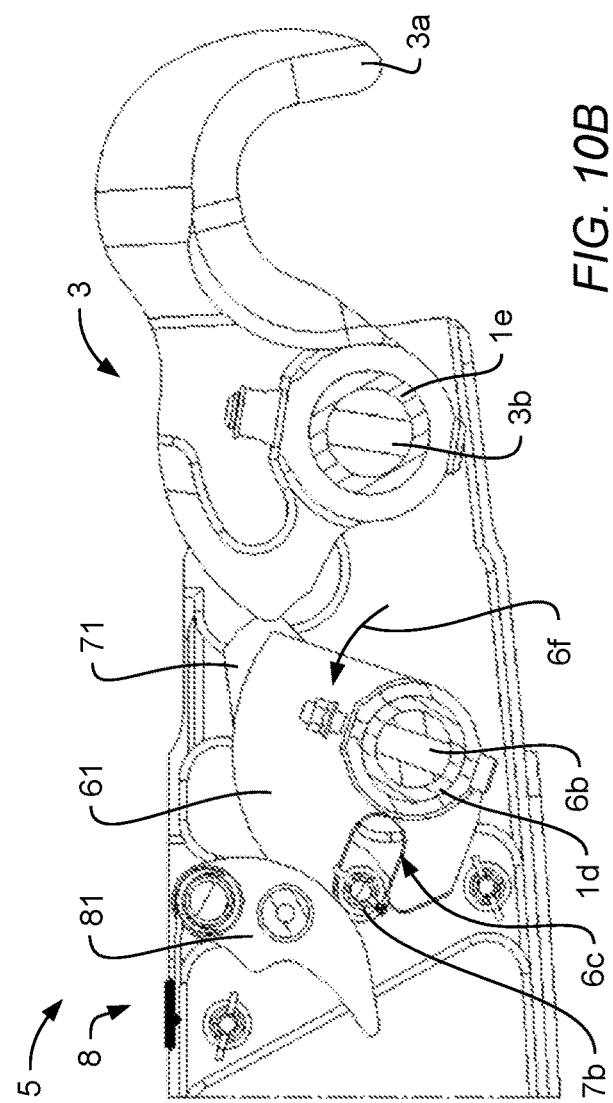
FIG. 10B shows the illustrative latching and locking devices of FIGS. 8B and 9B in a latched and unlocked position in accordance with some embodiments.

FIG. 10A and FIG. 10B show a second part of the unlocking and unlatching operation. The latch 3*a* is still in a latched position, but the locking device 5 is unlocked.

During the second part of the unlocking and unlatching operation, the rotatable locking shaft 1*d* continues rotating in an unlocking rotation direction 6*f*. Rotation of the rotatable locking shaft 1*d* causes rotation of the first and second locking cam components 61, 62. The first and second locking cam components 61, 62 are not blocking the latch 3*a* anymore.

The rotation of the first locking cam component 61 may rotate the guide contour 6*c*. The guide contour 6*c* drives the actuating roller 7*b*. The first and second latch securing lever components 71, 72 are driven by the actuating roller 7*b*.

By way of example, first and second latch securing lever components 71, 72 may still be engaged with the latch 3*a*. In other words, first and second latch securing lever components 71, 72 may maintain the latch 3*a* in a secured position.

Illustratively, the spring unit 7*e*, which is mounted to the second latch securing lever component 72 is driven in a releasing direction 7*l*, in which the spring unit 7*e* releases the latch securing lever components 71 and 72 from a securing position.

The first and second lock lockage components 81, 82 are still maintained in an unblocking position by the first and second contact rollers 7*d*.

Figure 11A:
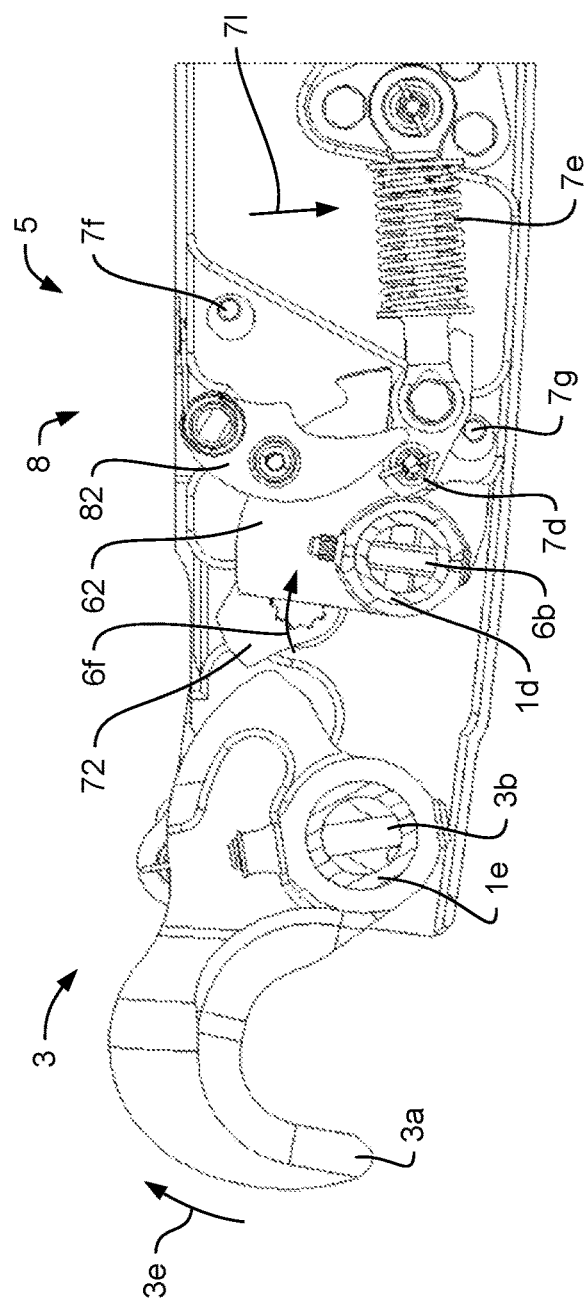
FIG. 11A shows the illustrative latching and locking devices of FIGS. 8A, 9A and 10A in a latched and fully unlocked position in accordance with some embodiments.
Figure 11B:
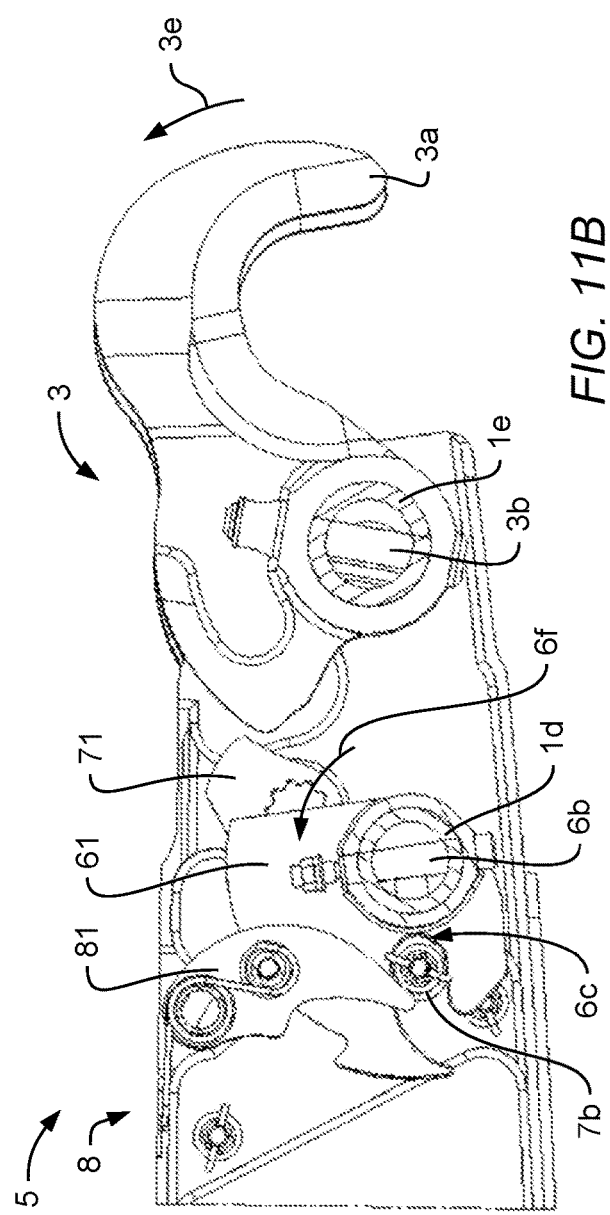
FIG. 11B shows the illustrative latching and locking devices of FIGS. 8B, 9B and 10B in a latched and fully unlocked position in accordance with some embodiments.

FIGS. 11A and 11B show a third part of the unlocking and unlatching operation. The latch 3*a* is still latched, and the locking device 5 is fully unlocked at the end of the third part of the unlocking and unlatching operation.

The rotatable locking shaft 1*d* has rotated to a fully unlocked position. Thus, the first and second locking cam components 61, 62, which are non-rotatably mounted to the rotatable locking shaft 1*d*, are in a fully unlocked position.

The first and second latch securing lever components 71, 72, which are driven by the first locking cam component 61, are in a fully unsecured position.

The movement of the second latch securing lever component 72 in a releasing direction 7*l*, in which the spring unit 7*e* releases the latch securing lever components 71 and 72 from a securing position, is limited in an unsecured position by the second stop bolt 7*g*.

Illustratively, the first and second lock lockage components 81, 82 are released to an unblocking position by the first and second contact rollers 7*d*.

Figure 12A:
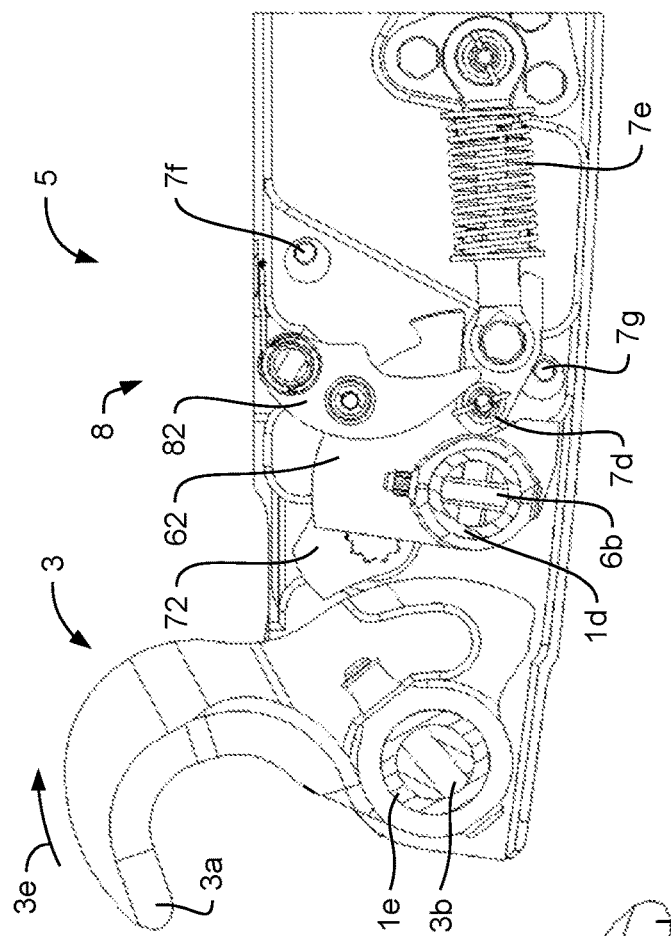
FIG. 12A shows the illustrative latching and locking devices of FIGS. 8A, 9A, 10A and 11A, in an unlatched and fully unlocked position in accordance with some embodiments.
Figure 12B:
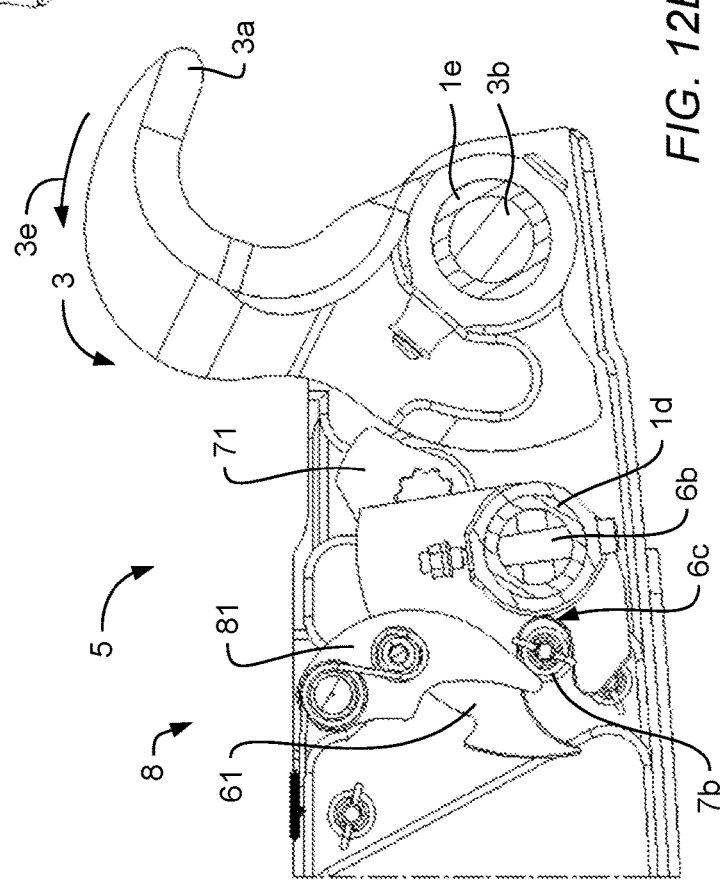
FIG. 12B shows the illustrative latching and locking devices of FIGS. 8B, 9B, 10B and 11B, in an unlatched and fully unlocked position in accordance with some embodiments.

FIG. 12A and FIG. 12B show the latching and locking devices of FIGS. 2 and 3 in an unlatched and unlocked position.

In the unlatched and unlocked position, neither first and second latch securing lever components 71, 72 nor first and second locking cam components 61, 62 are blocking latch 3*a*. Thus, rotation of latch 3*a* is no longer blocked.

As a result, the rotation of the rotatable latching shaft 1*e* in an unlatching rotation direction 3*e* causes rotation of the latch 3*a*, which is non-rotatably mounted to the rotatable latching shaft 1*e*.

FIGS. 13A to 14C show the occurrence of a failure of latch securing lever 7 during the movement of the locking device 5. As an example, a failure of latch securing lever 7 may be caused by a loss of a contact roller (e.g., contact roller 7*d* of FIG. 6).

By way of example, FIGS. 13A to 14C show the movement of the lock lockage 8 in case of an occurrence of a failure of the latch securing lever 7. Illustratively, the lock lockage 8 may be adapted to maintain the locking device 5 in an unlocked position in case of a failure of the latch securing lever 7.

Figure 13A:
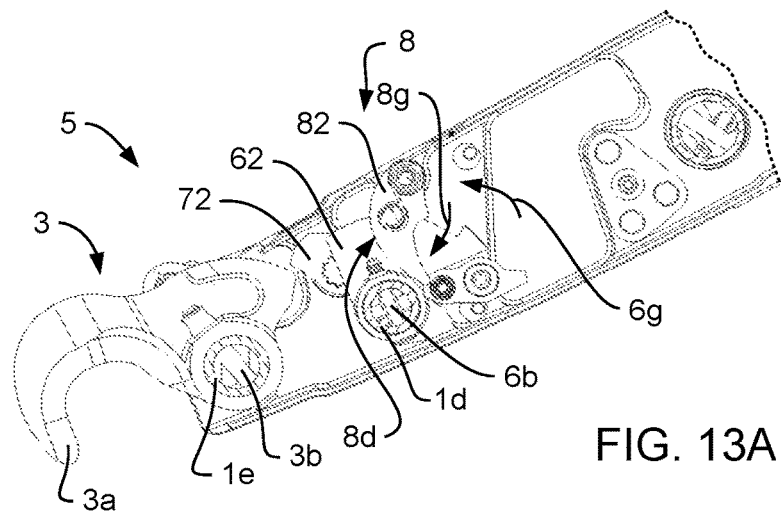
FIG. 13A shows the illustrative latching and locking devices of FIG. 11A in case of a failure occurrence in accordance with some embodiments.
Figure 13B:
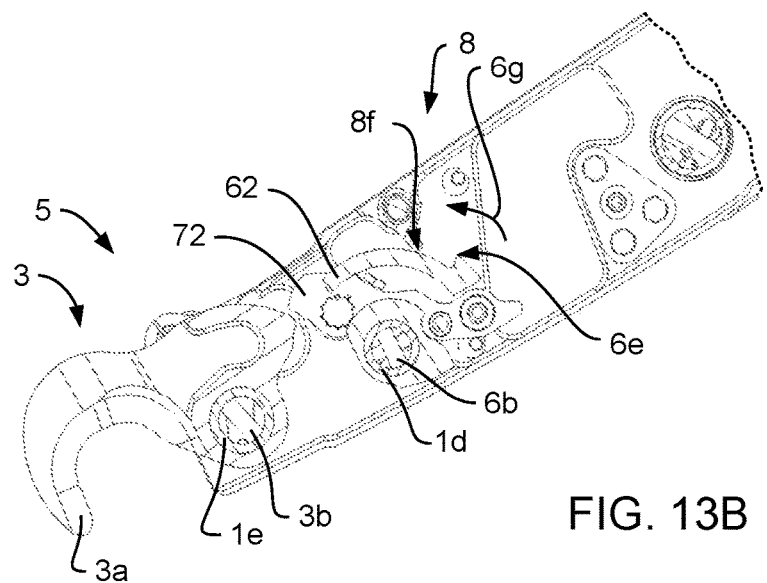
FIG. 13B is a section view of the illustrative latching and locking devices of FIG. 13A in accordance with some embodiments.
Figure 13C:
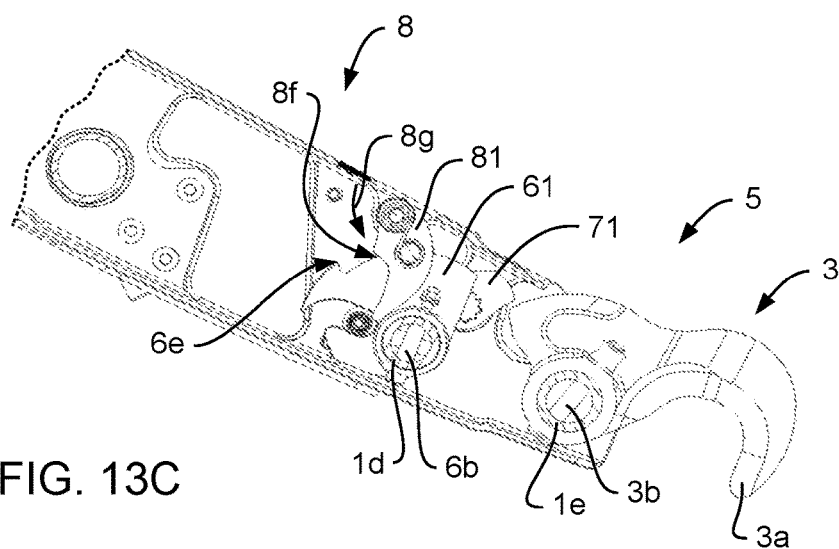
FIG. 13C shows the illustrative latching and locking devices of FIG. 11B in case of a failure occurrence in accordance with some embodiments.

FIG. 13A shows the illustrative latching and locking devices of FIG. 12A in the latched, unsecured, and unlocked position in case of a failure occurrence, FIG. 13B is a section view of the illustrative latching and locking devices of FIG. 12A in the latched, unsecured, and unlocked position, and FIG. 13C shows the illustrative latching and locking devices of FIG. 12B in the latched, unsecured, and unlocked position in case of the failure occurrence.

In other words, FIG. 13A shows the second latch securing lever component 72 unlatched, and the second locking cam component 62 unlocked, and FIG. 13C shows the first latch securing lever component 71 unlatched, and the first locking cam component 61 unlocked.

As an example, consider the scenario in which the contact rollers of the latch securing lever (e.g., contact rollers 7*d* of latch securing lever 7 of FIG. 6) were missing (e.g., the contact rollers broke off due to material fatigue). As another example, a securing device such as securing device 7*k* of FIG. 6 was lost, which resulted in the loss of the contact rollers.

In this scenario, movement of the first and second lock lockage components 81, 82 may not be driven or guided anymore by the first and second contact rollers (e.g., contact roller 7*d* of FIG. 11) contrary to FIG. 11A and FIG. 11B.

Instead, first and second lock lockage components 81, 82 have continued their rotation in the blocking direction 8*g*. For example, spring 8*b* of FIG. 7 may cause a continued rotation of first and second lock lockage components 81, 82 in the blocking direction 8*g*. The rotation in the blocking direction 8*g* of first and second lock lockage components 81, 82 is stopped when the contact surface 8*d* enters in contact with the second locking cam component 62.

Figure 14A:
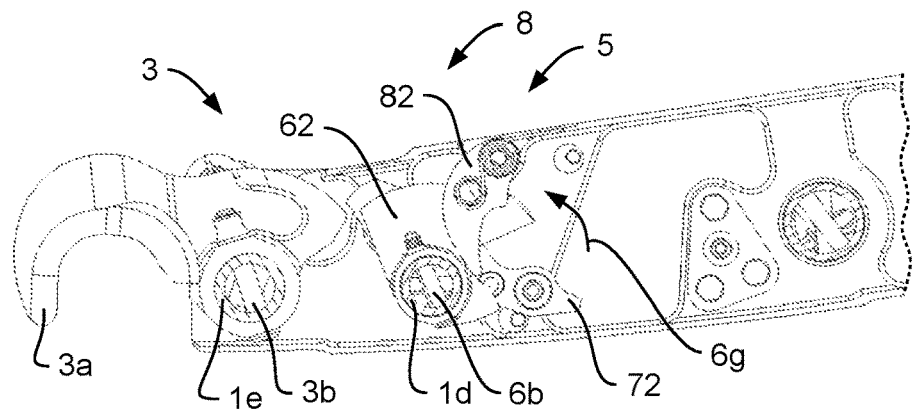
FIG. 14A shows the illustrative latching and locking devices of FIG. 13A in a blocked position in case of a failure occurrence in accordance with some embodiments.
Figure 14B:
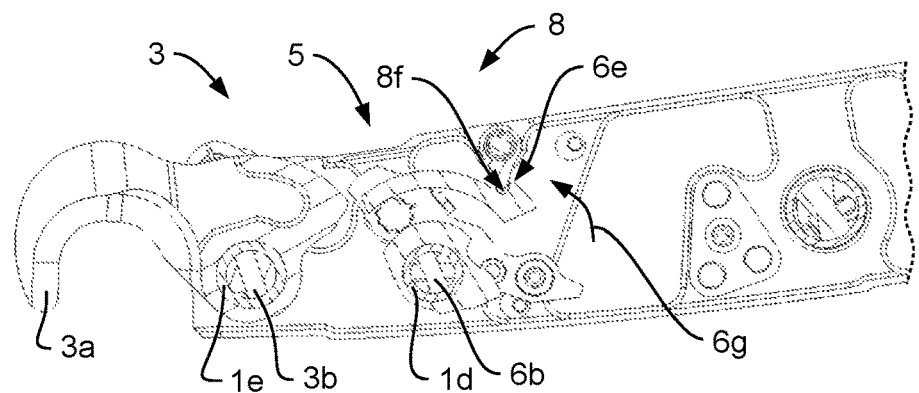
FIG. 14B is a section view of the illustrative latching and the locking devices of FIG. 14A in accordance with some embodiments.
Figure 14C:
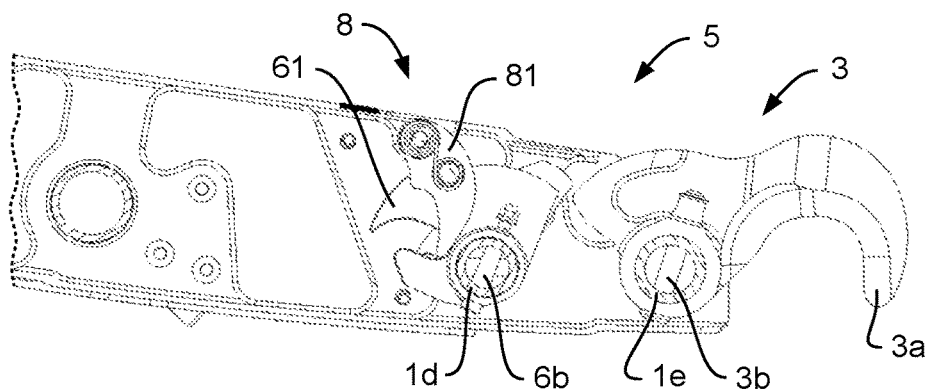
FIG. 14C shows the illustrative latching and locking devices of FIG. 13C in a blocked position in case of a failure occurrence in accordance with some embodiments.

FIG. 14A shows the illustrative latching and locking devices of FIG. 13A in a blocked position in case of a failure occurrence, FIG. 14B is a perspective view of the illustrative latching and the locking devices of FIG. 14A, and FIG. 14C shows the illustrative latching and locking devices of FIG. 13C in the blocked position in case of the failure occurrence in accordance with some embodiments.

In other words, FIG. 14A shows the second latch securing lever component 72 unlatched, and the second lock lockage component 82 in a blocking position, and FIG. 14C shows the first latch securing lever component 71 unlatched, and the first lock lockage component 81 in a blocking position.

As an example, consider the scenario in which the contact rollers of the latch securing lever (e.g., contact rollers 7d of latch securing lever 7 of FIG. 6) were missing.

In this scenario, the second lock lockage component 82 has rotated in a blocking rotation direction 8g. However, the second lock lockage component 82 does not engage with the locking cam component 62.

In fact, due to the loss of a contact roller (e.g., contact roller 7b of FIG. 6), the first and second latch securing lever components 71, 72 are not driven by the locking cam 6 anymore.

Illustratively, contact surface 8f of the second lock lockage component 82 stops the rotation of the second locking cam component 62. Indeed, the blocking counterpart 6e of the locking cam 6 of FIG. 5 engages with the contact surface 8f of the second lock lockage component 82.

Similarly, as shown in FIG. 14C, the first lock lockage component 81 blocks the first locking cam component 61. The locking device 5 cannot rotate in its locked position, i.e., the locking device 5 is maintained in an unlocked position.

If desired, the first lock lockage component 81 may also be operable independently from the second lock lockage component 82. In other words, the first lock lockage component 81 may be in a blocking position, while the second lock lockage component 82 may be in an inactive state, and vice versa. Any lockage blocking a lock component will avoid locking of the complete locking system.

It should be noted that modifications to the above described embodiments are within the common knowledge of the person skilled in the art and, thus, also considered as being part of the present invention.

For instance, the actuating system 1 may comprise an additional locking device 5, in case of a failure of the first locking device 5.

Moreover, the actuating system 1 of FIG. 1 is shown with six latching devices 3, 4. However, the actuating system 1 may have any number of latching devices 3, 4. For example, the actuating system 1 may have seven, eight, or more latching devices 3, 4.

Furthermore, the latching device 3 of FIG. 3 is exemplarily shown to include a latch securing lever 7 that is mounted to a spring unit 7e on one side of I-profile frame 9, whereby the spring unit 7e is mounted to the I-profile frame 9. However, the latching device 3 may include two latch securing levers 7, one on each side of I-profile frame 9. The two latch securing levers 7 may both be mounted to a different spring unit 7e, one on each side of I-profile frame 9, whereby the spring units 7e are mounted to the I-profile frame 9.

As another example, latching device 3 of FIG. 4 is shown with a contact surface 3c that is in contact with a latch securing lever on one side of the latching device 3 and another contact surface 3d that is in contact with a locking cam on another side of latching device 3. However, latching device 3 may have the contact surfaces 3c and 3d exchanged compared to what is shown in FIG. 4, under the premise that the corresponding latch securing levers and locking cams are also exchanged.

REFERENCE LIST 1 actuating system
1a actuating device
1b operating handle
1c actuating shaft
1d locking shaft
1e latching shaft
2 actuatable door
3 latching device
3a latch
3b pin
3c contact surface
3d contact surface
3e unlatching rotation direction
4 additional latching device
4a additional latch
5 locking device
6 locking cam
61 locking cam component
62 locking cam component
6a contact surface
6b pin
6c guide contour
6d contact surface
6e blocking counterpart
6f unlocking rotation direction
6g locking rotation direction
7 latch securing lever
71 latch securing lever component
72 latch securing lever component
7a contact surface
7b actuating roller
7c roller shaft
7d contact roller
7e spring unit
7f first stop bolt
7g second stop bolt
7h contact surface
7i serration
7j spherical bearing
7k securing device
7l releasing direction
8 lock lockage
81 lock lockage component
82 lock lockage component
8a spring contact
8b spring
8c lock lockage shaft
8d contact surface
8f contact surface
8g blocking direction
9 frame

What is claimed is:

1. An actuating system for an actuatable door, the actuating system comprising:
a rotatable latching shaft;
a rotatable locking shaft;
a latching device comprising:
a latch that is non-rotatably mounted to the rotatable latching shaft and adapted for maintaining the actuatable door in a closed position, wherein rotation of the rotatable latching shaft causes a rotation of the latch, and
a latch securing lever that comprises first and second contact surfaces, wherein the first contact surface is adapted to engage with the latch to maintain the latch in a closed and secured position; and
a locking device comprising:
a locking cam that is non-rotatably mounted to the rotatable locking shaft such that a rotation of the rotatable locking shaft causes a rotation of the locking cam, wherein the locking cam drives the latch securing lever and comprises third and fourth contact surfaces, wherein the third contact surface is adapted to engage with the latch to lock the latch in a closed and latched position, and wherein the fourth contact surface is adapted to engage with the second contact surface of the latch securing lever to prevent the latch securing lever from disengaging from a latched position while the locking cam is engaged;

wherein the actuating system further comprises at least one pin that prevents a rotation of the latch relative to the rotatable latching shaft.

2. The actuating system of claim 1, further comprising:
at least one pin that prevents a rotation of the locking cam relative to the rotatable locking shaft.

3. The actuating system of claim 1, further comprising:
a spring unit, wherein the latch securing lever is mounted to the spring unit.

4. The actuating system of claim 1, further comprising:
first and second stop bolts, wherein the latch securing lever is movable between the first stop bolt and the second stop bolt.

5. The actuating system of claim 1, wherein the latch securing lever further comprises:
at least one actuating roller that is attached to the latch securing lever.

6. The actuating system of claim 5, wherein the locking cam further comprises:
a guide contour that is adapted to drive the at least one actuating roller of the latch securing lever.

7. The actuating system of claim 1, further comprising:
at least one lock lockage that is adapted to maintain the locking device in an unlocked position in case of a failure of the latch securing lever.

8. The actuating system of claim 7, wherein each one of the at least one lock lockage further comprises:
a lock lockage shaft; and
first and second lock lockage components that are mounted to the lock lockage shaft, and wherein the first lock lockage component is operable independently from the second lock lockage component.

9. The actuating system of claim 8, wherein the latch securing lever further comprises:
first and second contact rollers that are attached to the latch securing lever.

10. The actuating system of claim 9, wherein the first and second lock lockage components further comprise:
respective fifth and sixth contact surfaces, wherein the fifth contact surface is adapted to engage with the first contact roller and the sixth contact surface is adapted to engage with the second contact roller.

11. The actuating system of claim 8, wherein the first and second lock lockage components further comprise:
respective first and second springs, wherein the first spring is adapted to push the first lock lockage component in a first blocking direction and wherein the second spring is adapted to push the second lock lockage component in a second blocking direction.

12. The actuating system of claim 1, wherein the locking device is adapted to be mounted onto a frame of the actuatable door, wherein the frame is particularly embodied as an I-frame.

13. The actuating system of claim 1, further comprising:
at least one additional latching device comprising an additional latch that is non-rotatably mounted to the rotatable latching shaft and adapted for maintaining the actuatable door in the closed position, wherein the rotation of the rotatable latching shaft causes a rotation of the additional latch.

14. An actuatable door, in particular for an aircraft, comprising the actuating system of claim 1.

15. An actuating system for an actuatable door, the actuating system comprising:
a rotatable latching shaft;
a rotatable locking shaft;
a latching device comprising:
a latch that is non-rotatably mounted to the rotatable latching shaft and adapted for maintaining the actuatable door in a closed position, wherein rotation of the rotatable latching shaft causes a rotation of the latch, and
a latch securing lever that comprises first and second contact surfaces, wherein the first contact surface is adapted to engage with the latch to maintain the latch in a closed and secured position; and
a locking device comprising:
a locking cam that is non-rotatably mounted to the rotatable locking shaft such that a rotation of the rotatable locking shaft causes a rotation of the locking cam, wherein the locking cam drives the latch securing lever and comprises third and fourth contact surfaces, wherein the third contact surface is adapted to engage with the latch to lock the latch in a closed and latched position, and wherein the fourth contact surface is adapted to engage with the second contact surface of the latch securing lever to prevent the latch securing lever from disengaging from a latched position while the locking cam is engaged;
wherein the latch securing lever further comprises:
at least one actuating roller that is attached to the latch securing lever.

16. The actuating system of claim 15, wherein the locking cam further comprises:
a guide contour that is adapted to drive the at least one actuating roller of the latch securing lever.

17. An actuating system for an actuatable door, the actuating system comprising:
a rotatable latching shaft;
a rotatable locking shaft;
a latching device comprising:
a latch that is non-rotatably mounted to the rotatable latching shaft and adapted for maintaining the actuatable door in a closed position, wherein rotation of the rotatable latching shaft causes a rotation of the latch, and
a latch securing lever that comprises first and second contact surfaces, wherein the first contact surface is adapted to engage with the latch to maintain the latch in a closed and secured position; and
a locking device comprising:
a locking cam that is non-rotatably mounted to the rotatable locking shaft such that a rotation of the rotatable locking shaft causes a rotation of the locking cam, wherein the locking cam drives the latch securing lever and comprises third and fourth contact surfaces, wherein the third contact surface is adapted to engage with the latch to lock the latch in a closed and latched position, and wherein the fourth contact surface is adapted to engage with the second contact surface of the latch securing lever to prevent the latch securing lever from disengaging from a latched position while the locking cam is engaged;
wherein the actuating system further comprises:
at least one lock lockage that is adapted to maintain the locking device in an unlocked position in case of a failure of the latch securing lever.

18. An actuating system for an actuatable door, the actuating system comprising:
- a rotatable latching shaft;
- a rotatable locking shaft;
- a latching device comprising:
  - a latch that is non-rotatably mounted to the rotatable latching shaft and adapted for maintaining the actuatable door in a closed position, wherein rotation of the rotatable latching shaft causes a rotation of the latch, and
  - a latch securing lever that comprises first and second contact surfaces, wherein the first contact surface is adapted to engage with the latch to maintain the latch in a closed and secured position; and
- a locking device comprising:
  - a locking cam that is non-rotatably mounted to the rotatable locking shaft such that a rotation of the rotatable locking shaft causes a rotation of the locking cam, wherein the locking cam drives the latch securing lever and comprises third and fourth contact surfaces, wherein the third contact surface is adapted to engage with the latch to lock the latch in a closed and latched position, and wherein the fourth contact surface is adapted to engage with the second contact surface of the latch securing lever to prevent the latch securing lever from disengaging from a latched position while the locking cam is engaged;

wherein the actuating system further comprises:
at least one additional latching device comprising an additional latch that is non-rotatably mounted to the rotatable latching shaft and adapted for maintaining the actuatable door in the closed position, wherein the rotation of the rotatable latching shaft causes a rotation of the additional latch.

19. An actuating system for an actuatable door, the actuating system comprising:
- a rotatable latching shaft;
- a rotatable locking shaft;
- a latching device comprising:
  - a latch that is non-rotatably mounted to the rotatable latching shaft and adapted for maintaining the actuatable door in a closed position, wherein rotation of the rotatable latching shaft causes a rotation of the latch, and
  - a latch securing lever that comprises first and second contact surfaces, wherein the first contact surface is adapted to engage with the latch to maintain the latch in a closed and secured position; and
- a locking device comprising:
  - a locking cam that is non-rotatably mounted to the rotatable locking shaft such that a rotation of the rotatable locking shaft causes a rotation of the locking cam, wherein the locking cam drives the latch securing lever and comprises third and fourth contact surfaces, wherein the third contact surface is adapted to engage with the latch to lock the latch in a closed and latched position, and wherein the fourth contact surface is adapted to engage with the second contact surface of the latch securing lever to prevent the latch securing lever from disengaging from a latched position while the locking cam is engaged;

wherein the actuating system further comprises at least one pin that prevents a rotation of the locking cam relative to the rotatable locking shaft.

* * * * *